United States Patent [19]

James

[11] 3,801,789

[45] Apr. 2, 1974

[54] CASSETTE HOLDER

[75] Inventor: Pierre Lucien Jules James, Saint Gratien, France

[73] Assignee: U.S. Philips Corporation, New York, N.Y.

[22] Filed: June 11, 1973

[21] Appl. No.: 368,952

Related U.S. Application Data

[63] Continuation of Ser. No. 217,648, Sept. 9, 1971, abandoned.

[30] Foreign Application Priority Data

Feb. 13, 1968  France ............................ 68.139630

[52] U.S. Cl. ............................... 250/468, 250/472
[51] Int. Cl. ........................................... G03b 41/16
[58] Field of Search ................... 250/468, 470, 471

[56] References Cited
UNITED STATES PATENTS
2,989,634  6/1961  Ould .................................. 250/66

Primary Examiner—James W. Lawrence
Assistant Examiner—C. E. Church
Attorney, Agent, or Firm—Frank R. Trifari

[57] ABSTRACT

Cassette holder having two openings at opposite sides through which a cassette can be inserted and held in place by locking members at each opening. A longitudinally displaceable bar interconnects the two locking members and movement of the bar toward either of the locking members will tilt the locking member to permit insertion of the cassette.

4 Claims, 4 Drawing Figures

PATENTED APR 2 1974 3,801,789

SHEET 2 OF 2

INVENTOR.
PIERRE L. J. JAMES
BY
AGENT

CASSETTE HOLDER

This is a continuation, of application Ser. No. 217,648, filed Sept. 9, 1971 now abandoned.

The invention relates to a cassette holder, and in particular, a holder for X-ray film cassettes.

In the known holders the cassette is inserted on one side through an opening in the longitudinal direction of one edge, said opening being subsequently closed by a known fixing member.

The unilateral insertion usually involves slow manipulation of the film cassettes. This is inconvenient when a great number of radiographs have to be consecutively made.

The invention has for its object to provide a different type of cassette holder which has the advantage that the cassette can be inserted from either of two sides, so that the manipulation is facilitated.

According to the invention a cassette holder is provided which has at least one internal sliding path for receiving the cassette. The holder is open along two sides each of which is located on one side of the sliding path. Each of the edges are provided with a locking member for securing the cassette in the holder. The locking members are connected with a device for opening either one locking member or the other.

Figure 1:
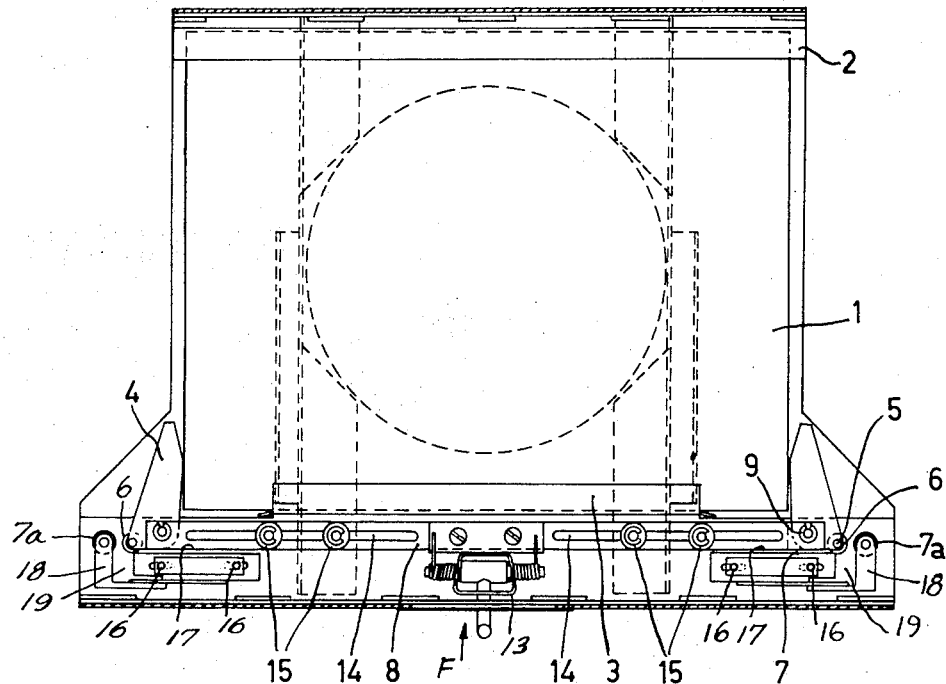
Figure 3A:
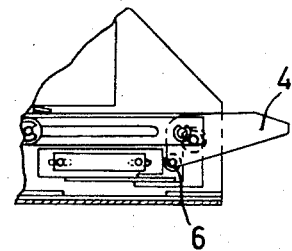
Figure 2:
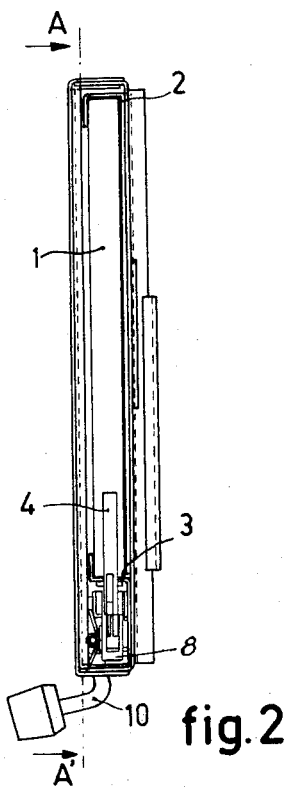
Figure 3:
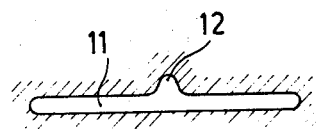

The invention will now be described more fully with reference to the accompanying drawing, in which FIG. 1 is a cross sectional view of the holder according to the invention (taken in the direction of A-A' in FIG. 2), FIG. 2 is a sectional view of the same holder in the direction of thickness, FIG. 3 is an elevation of the slot in the direction of the arrow F of FIG. 1, FIG. 3a is a partial sectional view showing the locking mechanism.

The cassette holder comprises a frame, for example, of metal, having substantially the shape of a parallelopiped, as is shown in the Figures. The film cassette 1 is held between two sliding paths 2 and 3, extending parallel to each other inside the holder along the longitudinal direction thereof.

On either side of the lower sliding path 3, at a given distance therefrom, two locking members 4 are provided for securing the cassette in the holder. The locking members 4, which are substantially angle-section iron members, are provided with a shaft 5 having a roller 6. Each roller 6 co-operates with a surface 7 on the frame. At the end of the surface 7 a circular roller 7a of the same diameter as the roller 6 is provided and serves to cause the locking member 4 to tilt, as will be explained hereinafter.

A slidable bar 8 interconnects the two locking members 4 and is connected with one limb of the angle-section iron of the members so as to be pivotable about a pin 9. Bar 8 is formed as a horizontally lying member having elongated slots 14 accommodating shafts 15. The locking members 4 are mounted by pins 9 for pivotal movement through the base of the bar 8. The length of the bar can be adjusted to the cassette size, so that it can match the calibration of different cassettes, both of inch- and centimetre-standardized cassettes. The bar 8 has at its centre an angular handle 10, adapted to move in a slot 11 (on the lower side of the frame), the shape of which is shown in FIG. 3. The slot 11 has a recessed portion 12 at its centre for receiving automatically the lever 10 during its movement by means of the spring 13.

The bar 8 has an elongated opening 14 on either side of the lever 10, said openings accomodating shafts 15, which are fastened to the frame so that the bar 8 is displaceable.

The locking members 4 are supported in an upright position as a result of roller 6 resting on support surface 7, which is secured to the frame at 16. The strip 7 is provided with a flat portion 17 extending sideways and parallel to the frame. The upright portion 18 supports roller 7a. Between the portion 18 and the end of strip 7 a sufficient amount of space 19 is provided to accommodate roller 6 of locking member 4.

In using the device, the lever 10 is displaced in the slot 11 to one side or the other. As a result of this displacement the sliding bar 8 is displaced so that the roller 6 is moved along the surface 7. As soon as the roller 6 comes into contact with the roller 7a, the locking member 4 is tilted about pin 9 into the position shown in FIG. 3a. As seen in FIG. 1, rollers 6 and 7a, having substantially the same diameters, are at about the same horizontal line, roller 7a forming a stationary stop. The horizontal transverse axis of pivot pin 9 is at a different level (above) the horizontal transverse axis of roller 6 so that when roller 6 contacts roller 7a as a result of manually moving bar 8 with handle 10, the resulting reaction force relative to pin 9 is offset therefrom thus exerting a torque to cause rotation of the locking member about the pin. The cassette can then be inserted. The cassette then bears first on the tilted member 4 and then onto the sliding path 3. By then moving the handle 10 in the opposite direction, the bar 8 is moved back and the locking member 4 returns into the locking position. The sliding bar 8 is displaced into its central position whilst the lever 10 snaps into the recess 12 and the system is locked in position. The cassette is then enclosed between the two locking members 4.

In order to remove the cassette it is sufficient to lift the lever 10 out of the recess 12 and to shift it in the slot 11 to the side where the cassette has to be taken out.

The length of the slot is sufficient (for example, 6cms) for facilitating the removal of the cassette.

The invention is not restricted to the embodiment described above and within the scope of the invention for example the locking members and the control of their tilting movements may be achieved in a different manner.

What is claimed is:

1. A holder for an x-ray film cassette comprising a frame formed by upper and lower guide rails arranged in spaced parallel relationship to each other for receiving and holding therebetween said cassette, said guide rails lying in a plane forming the plane of insertion of said cassette, a single sliding bar slidably mounted on said frame between a center position, a first operative position and a second operative position, first and second locking members comprising substantially angle-section members mounted on opposite ends of said sliding bar for pivotal movement between a closed and opened position for securing and positioning said cassette within the holder, a first roller rotatably attached to each of said locking members, said first rollers of said locking members cooperating with a supporting surface of said frame for guiding said members into a locking position, a second roller associated with each of said locking members rotatably mounted on said frame, said first roller of one of said locking members engaging said second roller associated therewith when said bar is displaced toward said locking member so as to cause said locking member to pivot in a plane parallel to the plane of insertion of the cassette between the closed and opened position, handle means attached to said bar for causing sliding movement thereof from said center position in one direction to said first operative position for causing said first and second rollers of said first locking members only to engage each other thereby causing said locking member to pivot in the same direction as said bar is moved to the opened position and thereby allow insertion and withdrawal of said cassette from the side of said first locking member, and for causing displacement of said bar in the other direction to said second operative position to cause pivoting in that direction of said second locking member only to the opened position to allow insertion and withdrawal of said cassette from the other side of said frame, and biasing means connected with said handle for locking said bar so that said cassette is secured between said locking members.

2. A holder for an x-ray film cassette comprising a frame formed by at least one guide rail for receiving said cassette, a pair of substantially angle-section members mounted on said frame for pivotal movement between an opened and closed position for holding the cassette therebetween when in the closed position, connecting means movably mounted between said angle-section members for movement between a center and two opposing operative positions, means for causing pivotal movement of each angle-section member when said connecting means is displaced toward said angle-section member to thereby pivot only the angle-section member toward which the connecting means is displaced to an open position so as to unlock the frame and allow insertion of said cassette, said angle section members being mounted for pivotal movement in a plane parallel to the plane of insertion of said cassette, and means attached to said connecting means for causing displacement of said connecting means.

3. The holder according to claim 2 wherein said connecting means comprises a bar slidably mounted on said guide rail, a guide slot in said bar, and guide pins engaged in said slot so as to guide the displacement of said bar.

4. The holder according to claim 3 wherein said means for causing pivotal movement of said angle-section members comprises a first roller rotatably mounted on said angle-section member and a second roller mounted on said frame, said first and second rollers arranged for engagement with each other when said bar is displaced toward one of said angle-section members to thereby cause said angle-section member to pivot to an unlocked position.

* * * * *